(12) United States Patent
Kamatani et al.

(10) Patent No.: US 8,671,555 B2
(45) Date of Patent: Mar. 18, 2014

(54) METHOD OF FORMING FLAT CONDUCTOR WIRE FOR USE IN CAGE-SHAPED DISTRIBUTED WINDING COIL

(75) Inventors: Hideki Kamatani, Toyota (JP); Kazuhiro Sato, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/499,263

(22) PCT Filed: Sep. 30, 2009

(86) PCT No.: PCT/JP2009/067075
§ 371 (c)(1),
(2), (4) Date: Mar. 29, 2012

(87) PCT Pub. No.: WO2011/039866
PCT Pub. Date: Apr. 7, 2011

(65) Prior Publication Data
US 2012/0186081 A1    Jul. 26, 2012

(51) Int. Cl.
*H01F 7/06* (2006.01)
(52) U.S. Cl.
USPC .......... 29/605; 29/606; 29/600.34; 242/365.3
(58) Field of Classification Search
USPC ........ 29/605–606, 732–736, 596–598; 72/64; 242/365.2–365.8
See application file for complete search history.

(56) References Cited

U.S. PATENT DOCUMENTS

| 5,778,512 A * | 7/1998 | Ichikawa et al. ................ 29/598 |
| 5,926,940 A | 7/1999 | Toh et al. |
| 7,343,662 B2 * | 3/2008 | Gorohata et al. ............... 29/596 |
| 7,624,768 B2 * | 12/2009 | Neet et al. .................... 140/92.1 |
| 7,891,082 B2 * | 2/2011 | Akimoto ......................... 29/606 |
| 8,056,215 B2 * | 11/2011 | Takada et al. .................. 29/605 |
| 8,225,491 B2 * | 7/2012 | Hashimoto et al. ............. 29/605 |
| 2012/0186081 A1 * | 7/2012 | Kamatani et al. ............... 29/868 |

FOREIGN PATENT DOCUMENTS

| JP | 59-169352 A | 9/1984 |
| JP | 63-060028 A | 3/1988 |
| JP | 63-309329 A | 12/1988 |
| JP | 10-066314 A | 3/1998 |

(Continued)

OTHER PUBLICATIONS

International Search Report of PCT/JP2009/067075 mailed Dec. 22, 2009.

*Primary Examiner* — Minh Trinh
(74) *Attorney, Agent, or Firm* — Kenyon & Kenyon LLP

(57) ABSTRACT

Firstly, a flat conductor raw wire is formed in a rectangular cross-section and bent in a continuous meandering pattern in a same plane to include in-slot wire portions arranged in each slot of the stator core, coil-end wire portions arranged as a coil end outside the slots, and bent portions joining the in-slot wire portions and the coil-end wire portions. Thereafter, in a setting step, the bent portions located at the opposite ends of the in-slot wire portion are grasped by a pair of grasping tools and the in-slot wire portion is grasped by a twisting jig. Next, in a processing step, the bent portions are twisted and bent into crank-shape by displacing a predetermined axis to a predetermined direction while rotating the twisting jig about the axis. The flat conductor is obtained by performing the setting step and the processing step each of the in-slot wire portions.

2 Claims, 9 Drawing Sheets

(56) References Cited

FOREIGN PATENT DOCUMENTS

| | | |
|---|---|---|
| JP | 2000-069700 A | 3/2000 |
| JP | 2002-051489 A | 2/2002 |
| JP | 2002-153001 A | 5/2002 |
| JP | 2008-048488 A | 2/2008 |
| JP | 2008-113539 A | 5/2008 |
| JP | 2000-139048 A | 5/2009 |
| JP | 2009-148147 A | 7/2009 |
| JP | 2010-178457 A | 8/2010 |
| JP | 2010-178458 A | 8/2010 |

* cited by examiner

METHOD OF FORMING FLAT CONDUCTOR WIRE FOR USE IN CAGE-SHAPED DISTRIBUTED WINDING COIL

CROSS-REFERENCE TO RELATED APPLICATIONS

This is a 371 national phase application of PCT/JP2009/067075 filed on 30 Sep. 2009, the entire contents of which are incorporated herein by reference.

TECHNICAL FIELD

The present invention relates to a cage-shaped distributed winding coil constituting a stator of a motor and more particularly to a method of forming a flat conductor wire for use in the cage-shaped distributed winding coil into a predetermined shape and a forming apparatus of the wire.

BACKGROUND ART

For instance, heretofore, Patent Document 1 listed below discloses a technique to form a cage-shaped distributed winding coil in such a manner that a plurality of wave winding coils each made of a flat conductor wire wound in a wave form are prepared and those coils are arranged to overlap with displacement of pitches from one another. However, the technique disclosed in Patent Document 1 could not achieve a cage-shaped distributed winding coil by simply overlapping the wave winding coils. This needs a step of sequentially braiding the wave winding coils. Coil production efficiency is therefore low.

The present applicants therefore propose, in Japanese patent application No. 2009-16549, a cage-shaped distributed winding coil that does not need the step of sequentially braiding the wave winding coils and thus can enhance the production efficiency. A flat conductor wire ("flat wire") constituting this cage-shaped distributed winding coil has a rectangular cross-section and is formed continuously in a meandering (rectangular-waves) pattern. This flat raw wire includes in-slot wire portions to be arranged to overlap one another in each slot of a stator core so that a long side of the rectangular cross-section is directed along a diameter direction of the stator core, circumferential conductor portions (coil-end portions) to be arranged to overlap one another at coil ends so that a short side of the rectangular cross-section is directed along to the diameter direction of the stator core, and bent portions (including twisting raw portions) bent to join the in-slot wire portions and the coil-end wire portions. Further, the above flat wires are overlapped to be wound by multiple turns, so that the in-slot wire portions and the coil-end wire portions are respectively overlapped one another, forming a cage-shaped distributed winding coil. This cage-shaped distributed winding coil is installed in a stator core by inserting the in-slot wire portions in the slots. In this way, a stator is obtained.

RELATED ART DOCUMENTS

Patent Documents

Patent Document 1: JP 2000-69700A
Patent Document 2: JP 2002-153001A
Patent Document 3: JP 2008-113539A

DISCLOSURE OF THE INVENTION

Problems to be Solved by the Invention

In the technique proposed as above, meanwhile, the in-slot wire portions and the coil-end wire portions of the flat wire are different in orientation of their long sides and short sides of the rectangular cross-section. To change the orientation of the long and short sides of the rectangular cross-section, it is necessary to twist a flat conductor raw wire ("flat raw wire") at a bent portion. It is further necessary to bend the flat raw wire into a crank shape at the bent portion in order to overlap respectively the in-slot wire portions and the coil-end wire portions.

Herein, when the bent portion of the flat raw wire is to be "twisted" and "bent in a crank shape", "twist forming" and "bend forming" are usually performed separately. In the twist forming, the in-slot wire portion is held by a twisting jig while the bent portions located on both ends of the in-slot wire portion are grasped with grasping tools, and the in-slot wire portion is rotated together with the twisting jig, twisting the bent portions. In the bend forming, the twisting jig is pressed in a specified direction while the in-slot wire portion is held with the twisting jig, thus bending each of the bent portions in a crank shape.

In the above forming method, however, two steps; the twist forming and the bend forming, are necessary. Since the forming of the bent portions is performed twice, a deformation amount of the flat raw wire during the forming is increased. This may deteriorate insulation properties. Further, when the bent portions are twisted, the flat raw wire tends to contract in a longitudinal direction. When the bent portions are fixed by the grasping tools, an insulation coat on the flat raw wire is forcedly pulled or stretched. In some cases, therefore, the thickness of the insulation coat decreases or the insulation coat is torn, resulting in concerns about a decrease in insulation.

The present invention has been made in view of the above circumstances and has a purpose to provide a method of forming a flat conductor wire for use in a cage-shaped distributed winding coil, capable of simultaneously twist forming and bend forming of a bent portion in a single step to reduce damage to the flat conductor wire during the forming step, and a forming apparatus of the wire.

Means of Solving the Problems

To achieve the above purpose, a first aspect of the invention provides a method of forming a flat conductor wire for use in a cage-shaped distributed winding coil, wherein a flat conductor raw wire before being formed into the flat conductor wire has a rectangular cross-section and is formed in a continuous meandering pattern in the same plane in advance, the flat conductor raw wire including in-slot wire portions to be arranged to overlap one another in each slot of a stator core, coil-end wire portions to be arranged to overlap one another at each coil end outside the slots, and bent portions joining the in-slot wire portions and coil-end wire portions, the method includes: a setting step of grasping the bent portions located on both ends of the in-slot wire portion by a pair of grasping tools and holding the in-slot wire portion by a twisting jig; and a processing step, following the setting step, of rotating the twisting jig about a predetermined axis line and displacing the axis line to twist and bend the bent portions in a crank shape, the setting step and the processing step being performed on all to the in-slot wire portions.

According to the above configuration, in the processing step following the setting step, the bent portions located on both ends of the in-slot wire portion are grasped by the pair of grasping tools, the twisting jig is rotated about the predetermined axis line while grasping the in-slot wire portion and the axis line is displaced in the predetermined direction, thereby twisting and bending the bent portions in a crank shape. This can change the orientation of the in-slot wire portion relative to the coil-end wire portion and also move the in-slot wire portion apart from the coil-end wire portion.

In the first aspect, preferably, each of the grasping tools is allowed to move in a direction of the axis line.

According to the above configuration, in addition to the operations of the first aspect, in the processing step, the grasping tools are allowed to move in the direction of the axis line in association with deformation of the bent portions. Thus, excessive force is not likely to act on the bent portions by the grasping tools.

To achieve the above purpose, a second aspect provides a forming apparatus of a flat conductor wire for use in a cage-shaped distributed winding coil, wherein a flat conductor raw wire before being formed into the flat conductor wire has a rectangular cross-section and is formed in a continuous meandering pattern in the same plane in advance, the flat conductor raw wire including: in-slot wire portions to be arranged to overlap one another in each slot of a stator core, coil-end wire portions to be arranged to overlap one another at each coil end outside the slots, and bent portions joining the in-slot wire portions and coil-end wire portions, the apparatus includes: a pair of grasping tools for grasping the bent portions located on both ends of the in-slot wire portion; and a twisting jig provided to hold the in-slot wire portion and be rotatable about a predetermined axis line and having the axis line displaceable in a predetermined direction.

According to the above configuration, this forming apparatus can be used in the forming method of the first aspect.

In the second aspect, preferably, each of the grasping tools is provided to be movable in a direction of the axis line.

According to the above configuration, in addition to the operations of the second aspect, the grasping tools are provided to be movable in the direction of the axis line in association with deformation of the bent portions, thus making it difficult to exert excessive force on the bent portions by the grasping tools.

Effects of the Invention

According to the first aspect, the twisting work and the bending work to the bent portions can be performed simultaneously in a single step, so that damage to the flat conductor wire during the forming work can be reduced.

In addition to the effects of the first aspect, it is possible to suppress damage to the insulation coat of the flat conductor wire to ensure the insulation performance.

According to the second aspect, when used in the forming method of the first aspect, the effects of the above forming method can be effectively exhibited.

In addition to the effects of the second aspect, it is possible to suppress damage to the insulation coat of the flat conductor wire to a minimum to ensure the insulation performance.

MODE FOR CARRYING OUT THE INVENTION

A detailed description of a preferred embodiment of a method of forming a flat conductor wire for use in a cage-shaped distributed winding coil and a forming apparatus of the wire embodying the present invention will now be given referring to the accompanying drawings.

Figure 1:
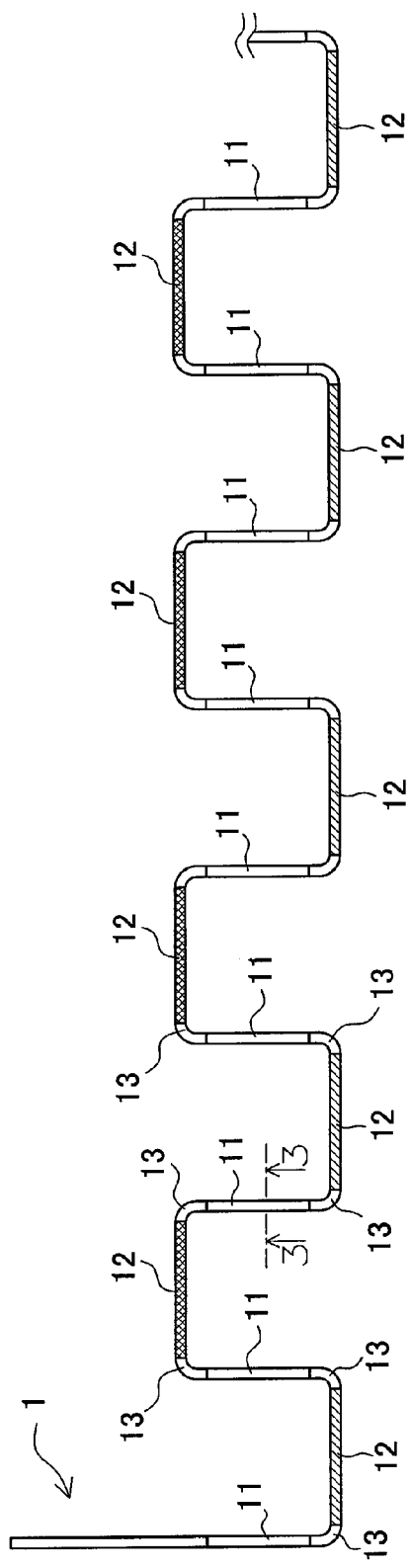
FIG. 1 is a plan view of a flat conductor raw wire before being formed into a flat conductor wire in a first embodiment.
Figure 2:
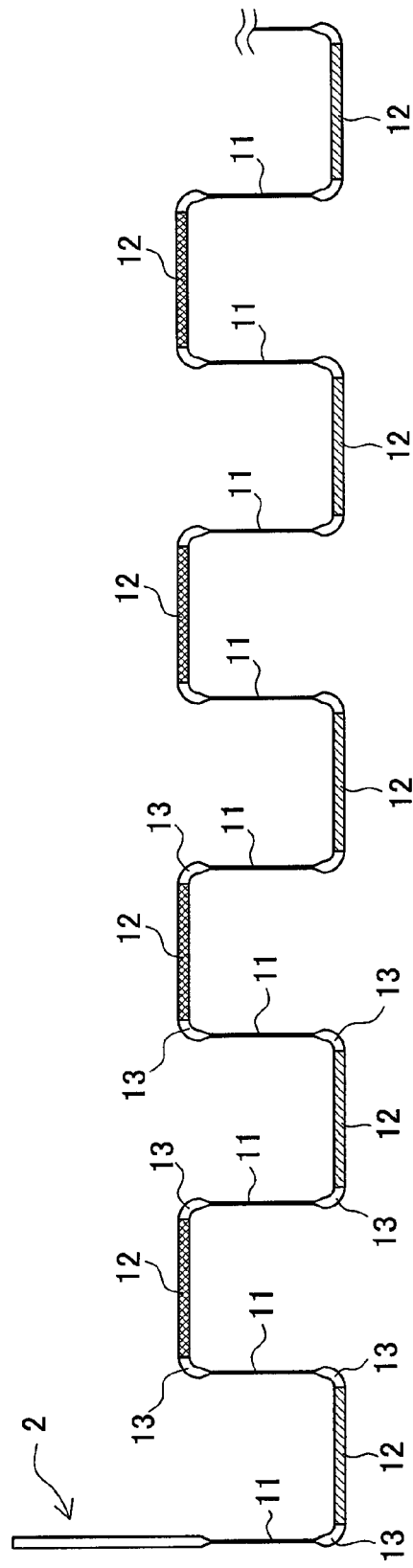
FIG. 2 is a plan view of a flat conductor wire formed of the flat raw wire in the first embodiment.

FIG. 1 is a plan view of a flat conductor raw wire ("flat raw wire") 1 before being formed into a flat conductor wire ("flat wire"). FIG. 2 is a plan view of a flat wire 2 formed of the flat raw wire 1. The flat wire 2 shown in FIG. 2 is to be used in a cage-shaped distributed winding coil constituting a stator of a three-phase motor.

Figure 3:
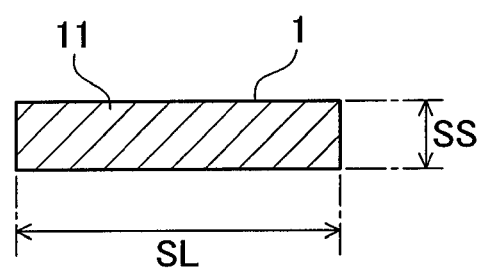
FIG. 3 is a cross-sectional view of the flat raw wire taken along a line 3-3 in FIG. 1 in the first embodiment.

As shown in FIG. 1, the flat raw wire 1 is formed in a continuous meandering (rectangular-waves) pattern. Although only part of the flat raw wire 1 is illustrated in FIG. 1, this wire 1 is actually longer than in FIG. 1. This flat raw wire 1 has a rectangular cross-section. FIG. 3 is an enlarged cross-sectional view taken along a line 3-3 in FIG. 1. In the present embodiment, the rectangular cross-section is "1 mm" in short side SS and "9 mm" in long side SL. The width of the flat raw wire 1 shown in FIG. 1 corresponds to the long side SL of this rectangular cross-section and the short side SS of the rectangular cross-section corresponds to the thickness of the flat raw wire 1. The flat raw wire 1 is made of copper and coated with enamel for insulation. The flat raw wire 1 shown in 1 is obtained by forming a straight flat raw wire in a meandering (rectangular-waves) pattern in the same plane in advance. As shown in FIG. 1, the flat raw wire 1 includes a plurality of in-slot wire portions 11 each extending vertically, a plurality of coil-end wire portions 12 each extending laterally, and bent portions 13 bent to join the in-slot wire portions 11 and the coil-end wire portions 12 adjacent thereto.

In the flat raw wire 1 shown in FIG. 1, the in-slot wire portions 11 and the bent portions 13 are mainly subjected to a forming work. The orientation of each in-slot wire portion 11 is changed by 90° from a state shown in FIG. 1 to a state shown in FIG. 2. Accordingly, each bent portion 13 is twisted and bent in a crank shape as mentioned later. With this forming work, the flat wire 2 shown in FIG. 2 is obtained. A plurality of the flat wires 2 thus formed are overlapped one another and wound by multiple turns so that the in-slot wire portions 11 and the coil-end wire portions 12 are overlapped respectively in multiple layers. Thus, a cage-shaped distributed winding coil is obtained. In FIGS. 1 and 2, the coil-end wire portions 12 are alternately applied with hatching and mesh for convenience. Further, in FIGS. 1 and 2, boundaries between the in-slot wire portions 11, the coil-end wire portions 12, and bent portions 13 are denoted with lines for convenience.

The cage-shaped distributed winding coil manufactured as above is installed in a stator core so that the in-slot wire portions 11 are inserted in slots. A stator of a motor is thus obtained. Herein, the in-slot wire portions 11 are arranged to overlap one another in each slot so that the long side SL of the rectangular cross-section is directed along a diameter direction of the stator core. The coil-end wire portions 12 are arranged to overlap one another at each coil end outside the slots so that the short side SS of the rectangular cross-section is directed along the diameter direction of the stator core.

Next, a forming method and a forming apparatus to form the flat raw wire 1 shown in FIG. 1 into the flat wire 2 shown in FIG. 2 will be explained.

Figure 4:
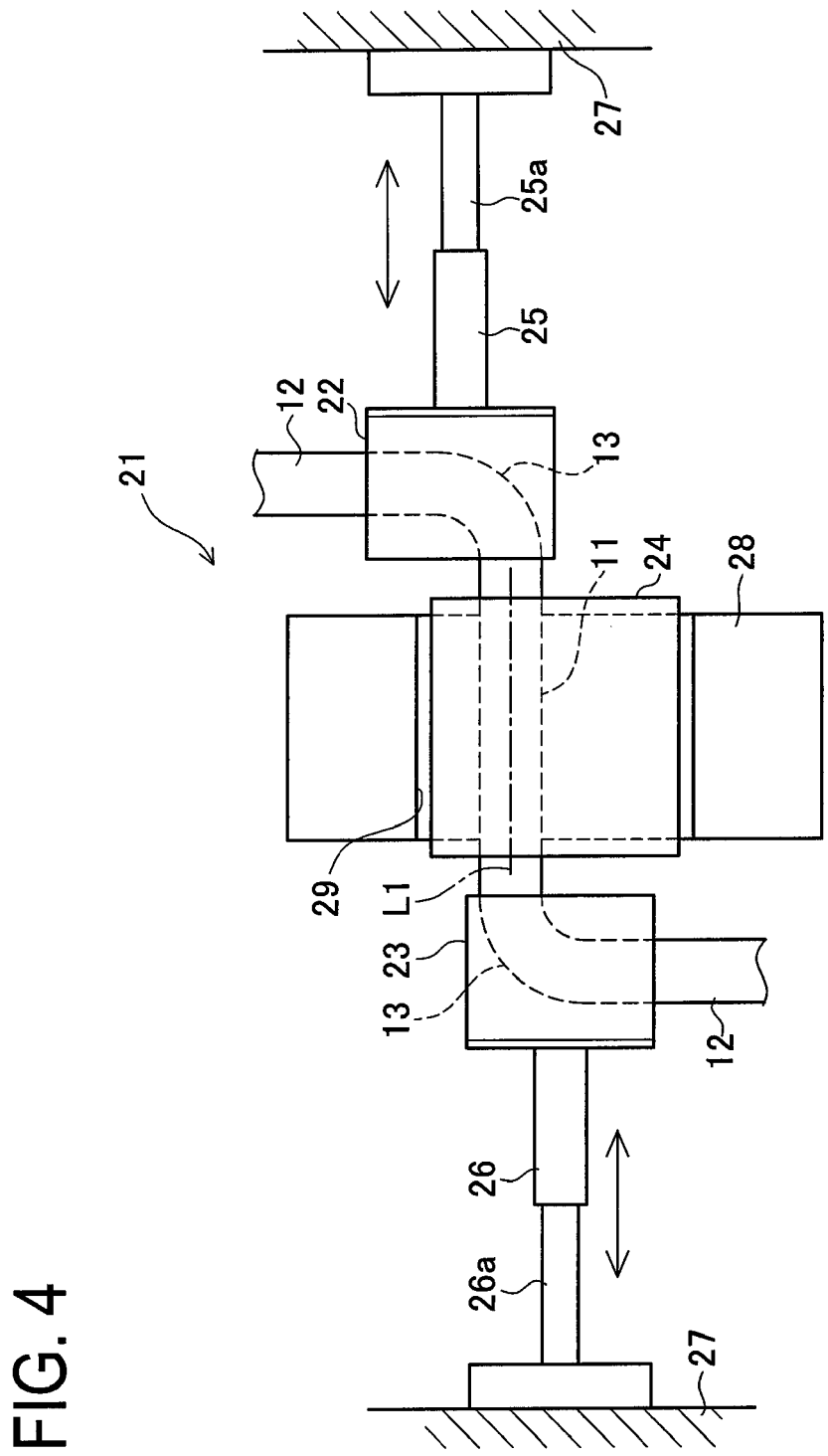
FIG. 4 is a plan view showing a schematic configuration of a forming apparatus in the first embodiment.

FIG. 4 is a plan view showing a schematic configuration of a forming apparatus 21 in the present embodiment. This forming apparatus 21 includes a pair of grasping tools 22 and 23 for grasping the bent portions 13 located on both ends of one in-slot wire portion 11 and a twisting jig 24 provided to be able to rotate about a predetermined axis line L1 while holding the in-slot wire portion 11 and to displace the axis line L1 in a predetermined direction.

As shown in FIG. 4, the grasping tools 22 and 23 are respectively fixed to one ends of cylinders 25 and 26. One ends of piston rods 25*a* and 26*a* provided respectively to be retractable in the cylinders 25 and 26 are fixed to machine bases 27. Accordingly, the grasping tools 22 and 23 are placed respectively to be rotatable in the axis direction of the twisting jig 24, that is, in the direction of the aforementioned axis line L1, within a range in which the piston rods 25*a* and 26*a* are movable relative to the corresponding cylinders 25 and 26.

Figure 5:
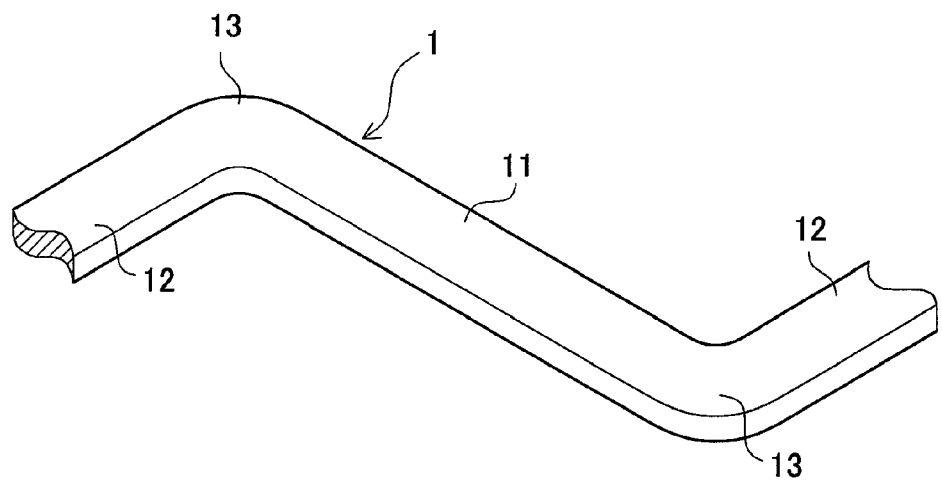
FIG. 5 is a perspective view of a part of the flat raw wire in the first embodiment.
Figure 6:
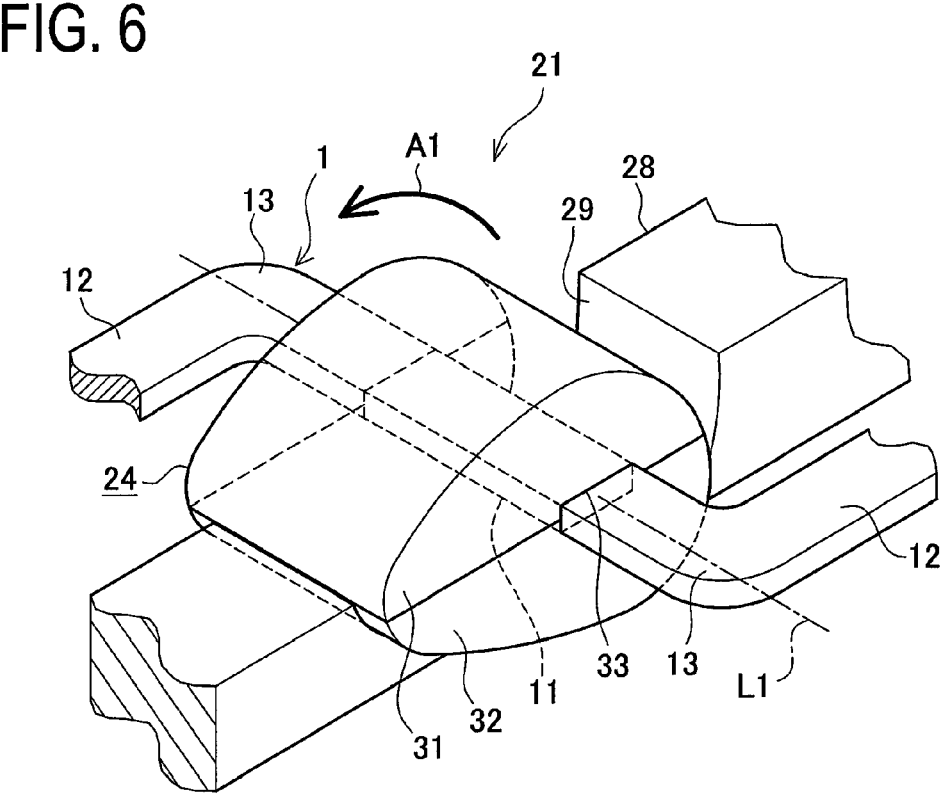
FIG. 6 is a perspective view showing a relationship between a twisting jig, a jig stage, and the flat raw wire in the first embodiment.

The twisting jig 24 is set in a recess 29 of a jig stage 28 as shown in FIG. 4 while holding the in-slot wire portion 11. FIG. 5 is a perspective view of a part of the flat raw wire 1. FIG. 6 is a perspective view showing a relationship between the twisting jig 24, the jig stage 28, and the flat raw wire 1. The twisting jig 24 has a columnar shape with both egg-shaped end faces. The twisting jig 24 consists of two jig pieces 31 and 32 to be separable into two. A hole 33 is formed between the jig pieces 31 and 32 to hold the in-slot wire portion 11. This hole 33 is located closer to large-diameter portions of the egg-shaped end faces of the twisting jig 24. The recess 29 formed in the jig stage 28 has a curved surface conformable to the outer shape of the twisting jig 24. The twisting jig 24 is configured to be rotatable, in the recess 29, in a direction of an arrow A1 about the axis line L1. When the twisting jig 24 is rotated in the recess 29 of the jig stage 28 about the axis line L1 in the direction of the arrow A1 while contacting with the curved surface of the recess 29, the axis line L1 which is the rotation center of the twisting jig 24 is displaced upward in FIG. 6.

Figure 7:
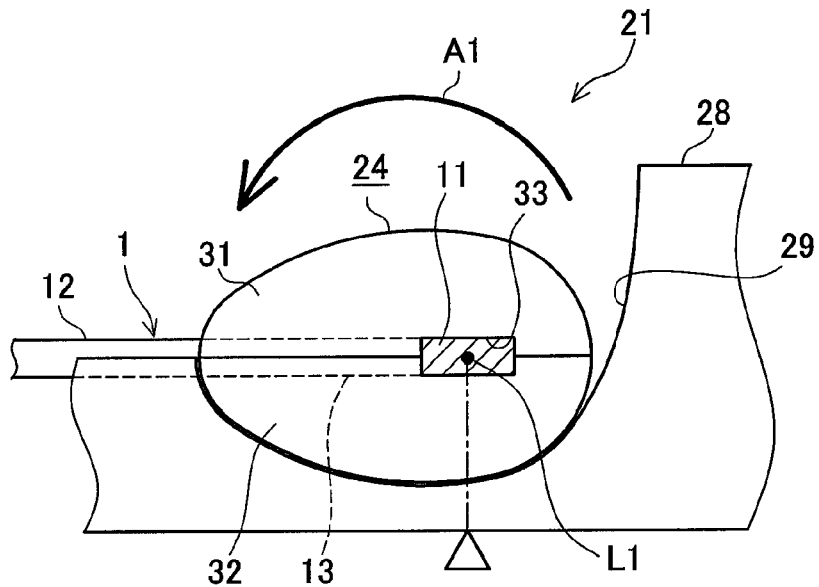
FIG. 7 is a side view showing a state of the forming apparatus in a setting step in the first embodiment.
Figure 8:
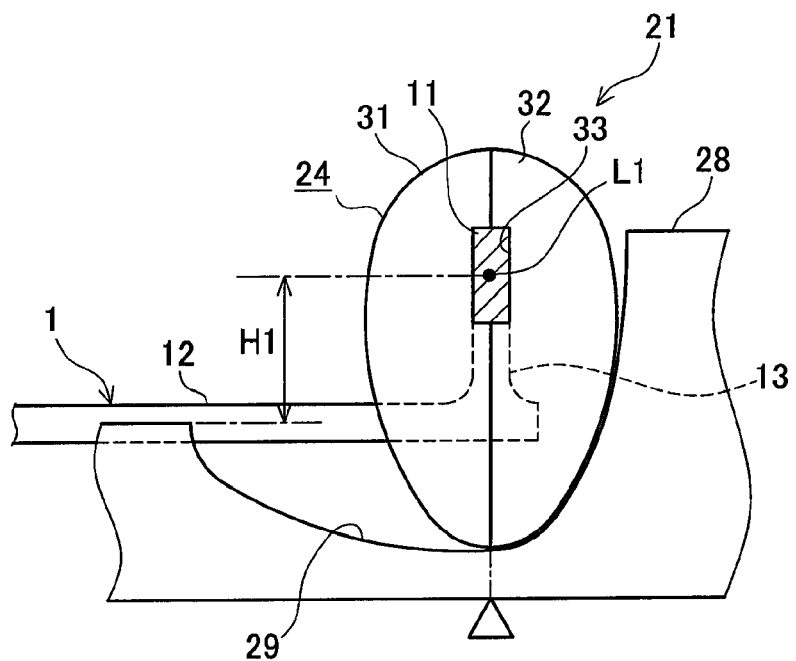
FIG. 8 is a side view showing a state of the forming apparatus in a processing step in the first embodiment.

A method of forming the flat wire 2 by use of the aforementioned forming apparatus 21 will be explained below. FIG. 7 is a side view showing a state of the forming apparatus 21 in a setting step. FIG. 8 is a side view showing a state of the forming apparatus 21 in a processing step. In FIGS. 7 and 8, only the flat raw wire 1 is illustrated in section.

When the flat raw wire 1 shown in FIG. 1 is to be formed into the flat wire 2 shown in FIG. 2, firstly, in the setting step, the bent portions 13 located on both ends of one in-slot wire portion 11 are partially grasped by the pair of grasping tools 22 and 23 and the in-slot wire portion 11 is held by the twisting jig 24, as shown in FIGS. 4 and 7. In this state, the twisting jig 24 is set sideways in the recess 29 of the jig stage 28. An upper part or a side part of the twisting jig 24 in this state is pressed by constant pressure. This pressing can prevent displacement or vibration of the twisting jig 24 during rotation. In this setting state, the axis line L1 which is the rotational center of the twisting jig 24 is located on the same level (height) as the coil-end wire portion 12.

Figure 9:
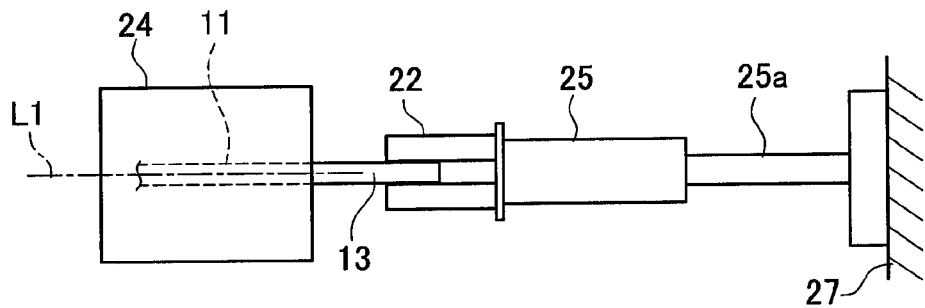
FIG. 9 is a front view showing a grasping tool and a twisting jig in a state before forming in the first embodiment.
Figure 10:
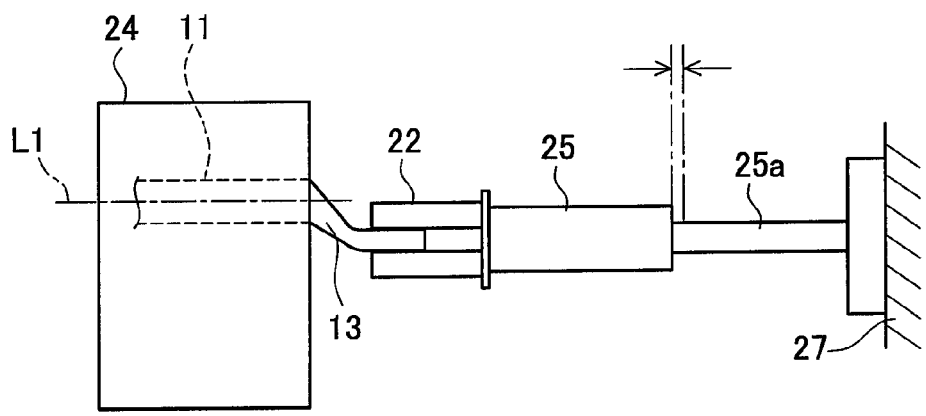
FIG. 10 is a front view showing the grasping tool and the twisting jig in a state after forming in the first embodiment.

In the processing step following the setting step, as shown in FIG. 7, the twisting jig 24 is rotated about the axis line L1 in the direction of the arrow A1 while the outer periphery of the twisting jig 24 slides along the curved surface of the recess 29. Accordingly, as shown in FIG. 8, the twisting jig 24 is rotated 90° from the position shown in FIG. 7 to a vertical posture. Accordingly, the axis line L1 which is the rotational center of the twisting jig 24 is displaced upward in FIGS. 7 and 8. Thus, the bent portions 13 are twisted and bent in a crank shape as shown in FIG. 8. At that time, the grasping tools 22 and 23 grasping the bent portions 13 on the both ends of the in-slot wire portion 11 are freely moved in the direction of the axis line L1 from respective positions shown in FIG. 9 to positions shown in FIG. 10. Accordingly, excessive force is not exerted on the flat raw wire 1, so that the bent portions 13 are twisted and bent in a natural way. FIG. 9 is a front view showing the grasping tool 22 and twisting jig 24 in a state before forming. FIG. 10 is a front view showing the grasping tool 22 and the twisting jig 24 in a state after forming. In the state after the processing step, as shown in FIG. 8, the axis line L1 which is the rotational center is located above and apart by a predetermined crank height H from the coil-end wire portion 12.

By performing the aforementioned setting step and processing step to all the in-slot wire portions 11 of the flat raw wire 1, the flat raw wire 1 shown in FIG. 1 can be formed into the flat wire 2 shown in FIG. 2.

Figure 11:
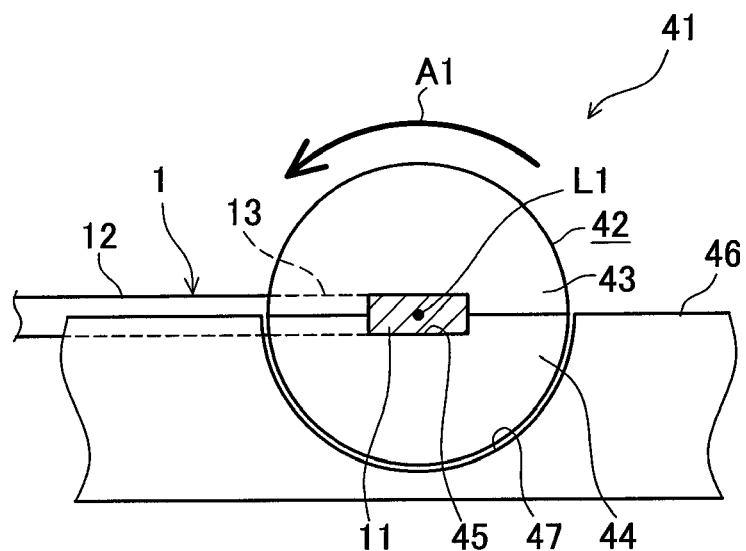
FIG. 11 is a side view showing a state of a forming apparatus for comparison in a setting step in the first embodiment.
Figure 12:
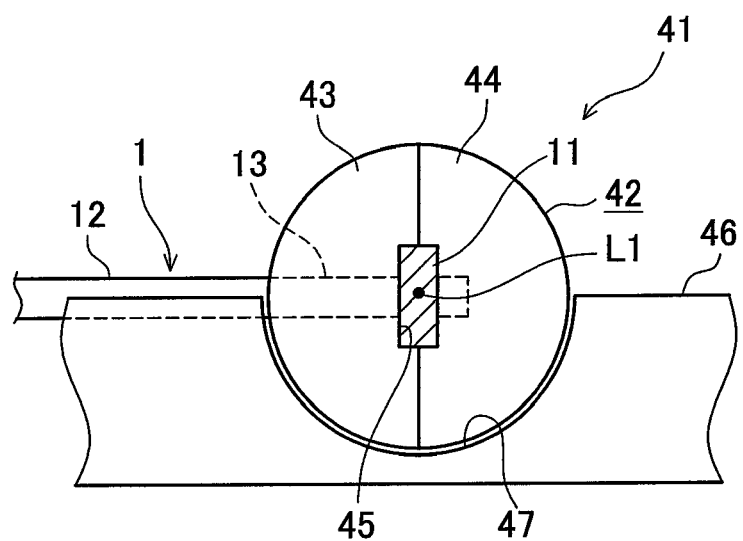
FIG. 12 is a side view showing a state of a forming apparatus for comparison in a processing step in the first embodiment.

A comparative example is shown in FIGS. 11 and 12 that are side views showing a forming apparatus 41 and a forming method in which bent portions 13 are only twisted without being formed in a crank shape when the orientation of an in-slot wire portion 11 is to be changed. FIG. 11 is a side view showing a state of the forming apparatus 41 for comparison in a setting step. FIG. 12 is a side view showing a state of the forming apparatus 41 for comparison in a processing step. In FIGS. 11 and 12, the flat raw wire 1 is illustrated in section. This forming apparatus 41 includes a twisting jig 42 having a columnar shape. The twisting jig 42 consists of two jig pieces 43 and 44 to be separable into two. Both jig pieces 43 and 44 are formed with a hole 45 to hold the in-slot wire portion 11. This hole 45 is located at the center of the circular end faces of the twisting jig 42. A recess 47 of a jig stage 46 has a curved surface conformable to the outer periphery of the twisting jig 42.

As shown in FIG. 11, while the in-slot wire portion 11 is held by the columnar twisting jig 42, the twisting jig 42 is rotated, in the recess 47, in a direction of an arrow A1, thereby twisting the bent portions 13, so that the orientation of the in-slot wire portion 11 is changed as shown in FIG. 12. In this forming apparatus 41, however, the axis line L1 which is the rotational center of the twisting jig 42 is not different before and after the rotation of the twisting jig 42. Thus, each bent portion 13 after the forming work does not have such a crank shape as shown in FIG. 8.

According to the forming method in the present embodiment explained above, in the processing step following the setting process, the bent portions 13 of the flat raw wire 1 located on both ends of the in-slot wire portion 11 are grasped by the pair of grasping tools 22 and 23, the twisting jig 24 holding the in-slot wire portion 11 is rotated about the predetermined axis line L1 and simultaneously the axis line L1 is displaced in the predetermined direction, thereby twisting and bending the bent portions 13 in a crank shape. As a result, the orientation of the in-slot wire portion 11 of the flat raw wire 1 is changed relative to the coil-end wire portions 12 and also the in-slot wire portion 11 is moved apart from the coil-end wire portions 12. Therefore, the twisting work of twisting the bent portions 13 and the bending work of bending the bent portions 13 in a crank shape can be performed simultaneously in a single step, so that the number of steps can be reduced from conventionally needed two steps to one step. This makes it possible to reduce the amount of deformation of the flat raw wire 1 during the forming work, thereby reducing damage to the formed flat wire 2 due to the forming work by just that much.

In the forming method of the present embodiment, based on an engagement relation between the jig stage 28 and the twisting jig 24, a placement changing condition of the twisting jig 24 is always maintained constant before and after rotation. Accordingly, variations in the crank height H1 of the formed bent portions 13 can be reduced. As a result, the orientation of the in-slot wire portions 11 can be changed constantly with the same shape. Herein, in order to appropriately change the crank height H1, it is only necessary to change the shapes of the twisting jig 24 and the jig stage 28.

In the forming method in the present embodiment, in the processing step, the grasping tools 22 and 23 are allowed to move in the direction of the axis line L1 in association with deformation of the bent portions 13. Accordingly, excessive force is not likely to act on the bent portions 13 by the grasping tools 22 and 23. Specifically, when the bent portions 13 are twisted and bent, the flat raw wire 1 tends to contract in its longitudinal direction. However, the grasping tools 22 and 23 grasping the bent portions 13 are allowed to move in the direction of the axis line L1 and hence the insulation coat on the flat raw wire 1 is not forcibly stretched or pulled. It is therefore possible to prevent damage to the insulation coat on the flat wire 2 to the minimum to ensure an insulation performance.

The forming apparatus 21 in the present embodiment can be used in the above forming method. Using this forming apparatus 21 in the above forming method can therefore effectively exhibit the operations and effects of the above forming method.

In the forming apparatus 21 in the present embodiment, the grasping tools 22 and 23 are provided to be movable in the direction of the axis line L1 in association with deformation of the bent portions 13. Thus, excessive force is not likely to act on the bent portions 13. It is therefore possible to suppress damage to the insulation coat to a minimum and ensure the insulation performance of the formed flat wire 2.

The present invention is not limited to the above embodiments and may be embodied as below in other specific forms without departing from the essential characteristics thereof.

Figure 13:
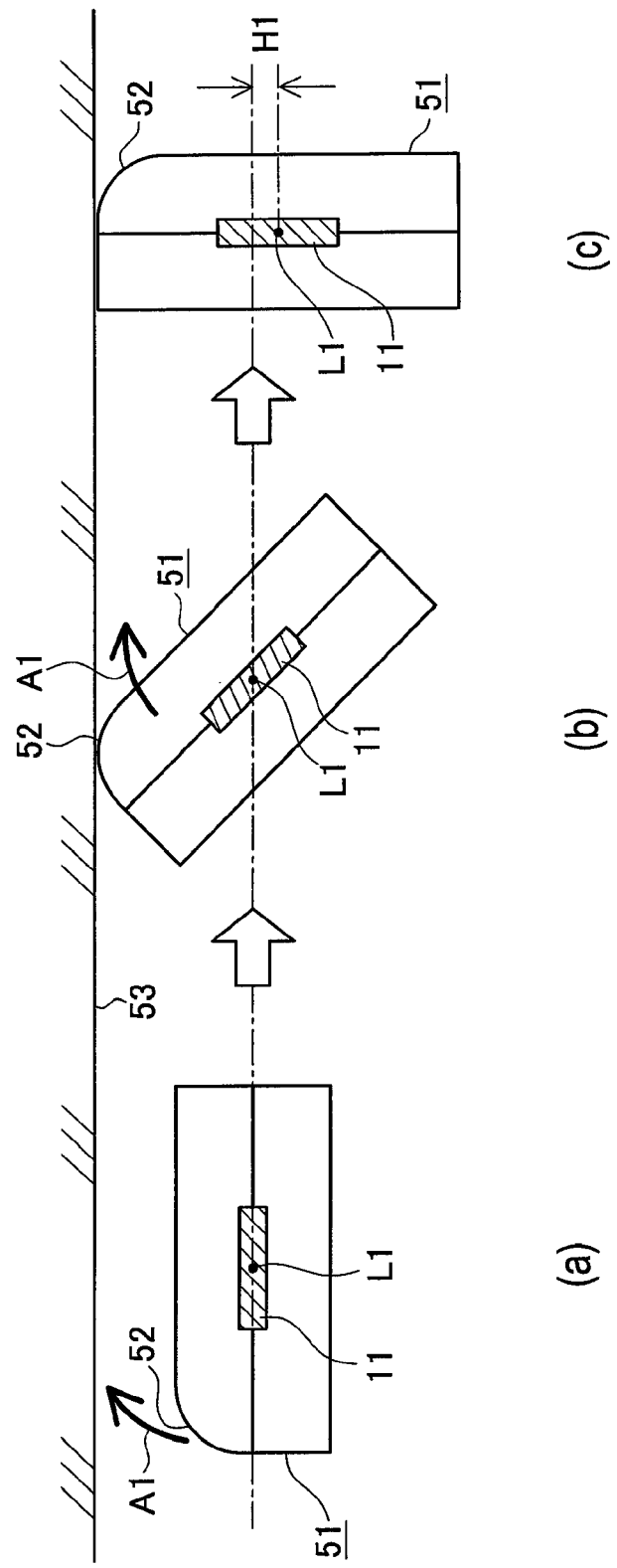
FIG. 13 shows another embodiment, in which (a) to (c) are side views showing a series of operations of a twisting jig.

In the above embodiments, the forming apparatus 21 is provided with the twisting jig 24 formed in a columnar shape with both end faces each having an egg-like form and the jig stage 28 for supporting the twisting jig 24 rotatably. On the other hand, as shown in FIG. 13, a twisting jig 51 is formed in a columnar shape with both end faces each having an almost rectangular form in which only one corner portion 52 of the almost rectangular form is curved. The twisting jig 51 is placed below a wall 53 defined by a rod or the like and slightly apart from the wall 53. FIG. 13 (a) to (c) show, in side views, a series of motions of the twisting jig 51 in another embodiment. According to the configuration of this forming apparatus, when the twisting jig 51 is rotated about the axis line L1 from a setting state shown in FIG. 13(a) in a direction of an arrow A1, the curved corner portion 52 of the twisting jig 51 hits or bumps against the wall 53 as shown in FIG. 13(b). When the twisting jig 51 is further rotated, the twisting jig 51 is pressed downward by the wall 53 as shown in FIG. 13(c). In this way, when the twisting jig 51 is rotated about a predetermined axis line L1 and the axis line L1 is displaced downward, the bent portions are twisted and bent in a crank shape.

INDUSTRIAL APPLICABILITY

The present invention relates to manufacturing of a motor stator and is available for forming a flat conductor wire for use in a cage-shaped distributed winding coil.

DESCRIPTION OF THE REFERENCE SIGNS

1 Flat conductor raw wire
2 Flat conductor wire
11 In-slot wire portion
12 Coil-end wire portion
13 Bent portion
21 Forming apparatus
22 Gripping tool
23 Gripping tool
24 Twisting jig
51 Twisting jig
L1 Axis line

The invention claimed is:

1. A method of forming a flat conductor wire for use in a cage-shaped distributed winding coil, the method comprising the steps of:
a forming step of forming a flat conductor raw wire in a rectangular cross-section;
a bending step of bending the flat conductor raw wire in a continuous meandering pattern in the same plane to include in-slot wire portions to be arranged to overlap one another in each slot of a stator core, coil-end wire portions to be arranged to overlap one another at each coil end outside the slots, and bent portions joining the in-slot wire portions and coil-end wire portions;
a setting step of grasping the bent portions of the flat conductor raw wire formed in the continuous meandering pattern, the bent portions being located on both ends of the in-slot wire portion, by a pair of grasping tools and holding the in-slot wire portion by a twisting jig; and
a processing step of rotating the twisting jig holding the in-slot wire portions about a predetermined axis line and displacing the axis line to twist and bend the bent portions in a crank shape,
the setting step and the processing step being performed on all to the in-slot wire portions.

2. The method of forming a flat conductor wire for use in a cage-shaped distributed winding coil according to claim 1, wherein each of the grasping tools is allowed to move in a direction of the axis line.

* * * * *